(12) United States Patent
Li

(10) Patent No.: US 6,268,683 B1
(45) Date of Patent: Jul. 31, 2001

(54) TRANSDUCER CONFIGURATIONS AND RELATED METHOD

(75) Inventor: Guang Li, DuBois, PA (US)

(73) Assignee: M&FC Holding Company, Wilmington, DE (US)

( * ) Notice: Subject to any disclaimer, the term of this patent is extended or adjusted under 35 U.S.C. 154(b) by 0 days.

(21) Appl. No.: 09/258,475

(22) Filed: Feb. 26, 1999

(51) Int. Cl.$^7$ .................................................. H01L 41/04
(52) U.S. Cl. ......................... 310/348; 310/334; 310/326; 310/312
(58) Field of Search .................................... 310/326, 334, 310/348, 312

(56) References Cited

U.S. PATENT DOCUMENTS

| | | | |
|---|---|---|---|
| 2,808,524 | 10/1957 | Feinstein | 310/8.4 |
| 2,984,800 | * 5/1961 | Page | 310/348 |
| 3,068,446 | 12/1962 | Ehrlich et al. | 340/8 |
| 3,716,828 | 2/1973 | Massa | 340/10 |
| 3,794,866 | 2/1974 | McElroy et al. | 310/8.2 |
| 3,890,423 | 6/1975 | Zacharias, Jr. | 310/326 |
| 3,928,777 | 12/1975 | Massa | 310/8.2 |
| 3,935,484 | 1/1976 | Lescheck et al. | 310/326 |
| 3,943,388 | * 3/1976 | Massa | 310/312 |
| 4,030,175 | 6/1977 | McShane | 29/25.35 |
| 4,110,654 | * 8/1978 | Paul | 310/323 |
| 4,183,007 | 1/1980 | Baird | 367/119 |
| 4,184,094 | 1/1980 | Kopel | 310/335 |
| 4,437,032 | * 3/1984 | Gelhard | 310/324 |
| 4,611,372 | 9/1986 | Enjoji et al. | 29/25.35 |
| 4,769,571 | * 9/1988 | Habeger et al. | 310/334 |
| 4,823,041 | 4/1989 | Inoue et al. | 310/322 |
| 5,097,172 | * 3/1992 | Becks | 310/348 |
| 5,272,797 | 12/1993 | Mijoshi | 29/25.35 |
| 5,281,935 | 1/1994 | Knecht et al. | 333/187 |
| 5,375,099 | 12/1994 | Gill | 367/140 |
| 5,461,931 | 10/1995 | Gill | 73/861.28 |
| 5,612,930 | 3/1997 | Hazony et al. | 367/140 |
| 5,751,200 | * 5/1998 | Yamashita et al. | 333/197 |

FOREIGN PATENT DOCUMENTS

| | | | |
|---|---|---|---|
| 196 01 570 A1 | 1/1996 | (DE) | G01H/17/00 |
| 57-173299 | * 10/1982 | (JP) | 310/334 |

* cited by examiner

*Primary Examiner*—Thomas M. Dougherty
(74) *Attorney, Agent, or Firm*—Thompson Hine LLP

(57) ABSTRACT

A transducer for use in an ultrasonic gas flow meter includes a housing having an open end and a closed end with a side wall extending therebetween. The closed end of the housing is shaped to receive and transmit sound waves during operation of the transducer. A resonator is positioned in the housing with a transmitting and receiving end facing the closed end of the housing. A thickness of the side wall of the housing at the closed end is less than at a position further toward the open end in order to divert and diffuse spurious vibrations that might otherwise occur near the resonating frequency of the transducer. Generally, such vibration diversion and diffusion is best achieved when the thickness of the side wall housing gradually decreases toward the closed end of the housing. Further, an outer diameter of the housing side wall may gradually decrease toward the closed end of the housing to improving ringing and bandwidth properties. A method of manufacturing a transducer for operation within a predetermined frequency range is also provided.

40 Claims, 5 Drawing Sheets

TRANSDUCER CONFIGURATIONS AND RELATED METHOD

BACKGROUND OF THE INVENTION

The present invention relates to transducers and, more particularly, to a transducer suited for use in ultrasonic gas flow meters and a method of manufacturing such a transducer.

Meters which utilize ultrasonic transducers to measure the flow of a fluid are well known. For example, in one technique the difference between the time of travel of an ultrasonic wave upstream in a flowing gas and the time of travel of an ultrasonic wave downstream in the flowing gas is used to determined the flow rate of the gas. Ultrasonic transducers are utilized in such technique for receiving and transmitting the ultrasonic waves. Successful introduction of such gas flow meters requires that all manufacturing and production costs be carefully considered. Ultrasonic transducers are also utilized to establish the speed of sound within a gas by transmitting sound waves from the transducer, reflecting them off of a surface at a known distance, and receiving them back by the same transducer. Another technique for establishing the speed of sound within a gas involves transmitting sound waves from one transducer and receiving them at another transducer at a known distance. The time between transmission, reflection and reception in the case of a single transducer, or transmission and reception in the case of multiple transducers, can then be used to calculate the speed of sound within the particular gas.

In known meters the transducer is one of the most costly components for a variety of reasons. Known transducers suffer from a relatively low production yield due to, among other factors, a complex structure and fabrication procedure leading to noticeable property variations. One known type of transducer used in such gas meters includes a quarterwave matching plate covered by a foil cap. Production problems such as inconsistent foil cap pleats and widely varying quarterwave plate dimensions and material properties lead to uncorrectable variations. Further, known transducers are somewhat limited in terms of the gas pressures under which they may be utilized and are not hermetically sealed from the gas stream.

Accordingly, it would be desirable to provide a simple transducer configuration and related method of manufacture which results in higher production yields and lower transducer costs. It would also be desirable to provide a transducer capable of operating under higher gas pressures. A method of manufacturing such transducers for operation within a predetermined frequency range would further be desirable.

SUMMARY OF THE INVENTION

The present invention is a transducer configuration suited for use in ultrasonic gas flow meters, as well as in other types of systems. In a preferred embodiment of the invention the transducer includes a housing having an outer open end and an inner closed end with a side wall extending therebetween. The closed end of the housing is shaped to receive and transmit ultrasonic waves when positioned within the gas flow meter. A resonator is positioned within the housing and has a transmitting and receiving end facing the closed end of the housing. A thickness of the housing side wall at the closed end is less than at a position further toward the open end so that spurious vibrations that might otherwise occur near the resonating frequency of the transducer are reduced. Generally, such vibration reduction is best achieved when the thickness of the side wall housing gradually decreases toward the closed end of the housing.

In another aspect of the present invention a transducer for use in an ultrasonic gas flow meter includes a housing having an outer open end and an inner closed end with a side wall extending therebetween, the closed end being shaped to receive and transmit ultrasonic waves. A resonator is positioned within the housing with a transmitting and receiving end facing the closed end of the housing. An outer diameter of the housing side wall gradually decreases toward the closed end of the housing in order to suppress the magnitude of undesirable incidental housing vibrations.

A further aspect of the present invention provides a transducer mountable in a gas flow meter, including a housing having an open end and a closed end with a side wall extending therebetween, the closed end for receiving and transmitting sound waves. A resonator is positioned within the housing with a transmitting and receiving end facing the closed end of the housing. A resonator support positioned within the housing includes a base portion and a plurality of arm members extending from the base portion toward the closed end of the housing. At least a portion of the plurality of arm members contacts a side surface of the resonator and at least a portion of the base portion contacts an inner surface of the housing side wall for positioning the resonator within the housing. The resonator support provides a simple device for properly positioning the resonator centrally within the housing for improved performance and operation.

The subject transducers can be formed with a plastic housing suited for use in lower pressure applications or with a metal housing which is better suited for higher pressure applications. The closed end of the housing is used for transmitting and receiving sound waves such that in gas meter applications the matching plate and resonator can be isolated from the gas. Such transducer configurations may also include a damping medium within the housing in the space defined between the inner surface of the housing side wall and the outer surface of the resonator.

A method of manufacturing a transducer in accordance with the present invention involves providing a support member having a base portion and a plurality of arm members extending from the base portion. A resonator is positioned within a space defined by the plurality of arms of the support member. A housing having an open end and a closed end with a side wall extending between the ends is provided and a matching material is introduced into the housing from the open end such that the matching material lies adjacent the closed end of the housing. The resonator and support member are simultaneously loaded into the open end of the housing such that a first end of the resonator contacts the matching material. A damping medium is thereafter introduced into a space defined between an outer surface of the resonator and an inner surface of the housing side wall. Prior to curing the matching material, the resonator can be pressed slightly into the matching material to achieve a desired distance between an inner end of the resonator and the outer surface of the closed end of the housing.

In order to increase the number of transducers suitable for operation within a predetermined frequency range, a method of manufacturing a given transducer for operation within the predetermined frequency range involves providing a housing having an open end and a closed end with a side wall extending between the ends. A resonator is positioned within the housing such that a transmitting and receiving end faces the closed end of the housing and an opposite end faces the open end of the housing. A determination is made as to whether an initial operating frequency of the transducer is outside the predetermined frequency range and a thickness of the closed end of the housing is adjusted if the initial operating frequency of the transducer is determined to be outside the predetermined frequency range. In particular, the thickness of the closed end of the housing is reduced if the initial operating frequency is determined to be below the predetermined frequency range, and the thickness of the closed end of the housing is increased if the initial operating frequency is determined to be above the predetermined frequency range. This method results in a relatively high production yield of suitable transducers and therefore less waste and a lower per unit cost.

Accordingly, it is an object of the present invention to provide a simple method of manufacturing a transducer; a method of manufacturing a transducer for operation within a predetermined frequency range; a transducer having improved ringing and bandwidth properties; a transducer configured for reducing spurious vibrations that might otherwise occur near the resonating frequency of the transducer; a transducer including a simple structure for positioning a resonator centrally within a housing for improved performance and operation; a transducer configured for use in high pressure applications; and a transducer with a hermetic seal on the side exposed the flowing gas. Other objects and advantages of the present invention may be ascertained from a review of the following description and drawings.

DETAILED DESCRIPTION

Figure 1:
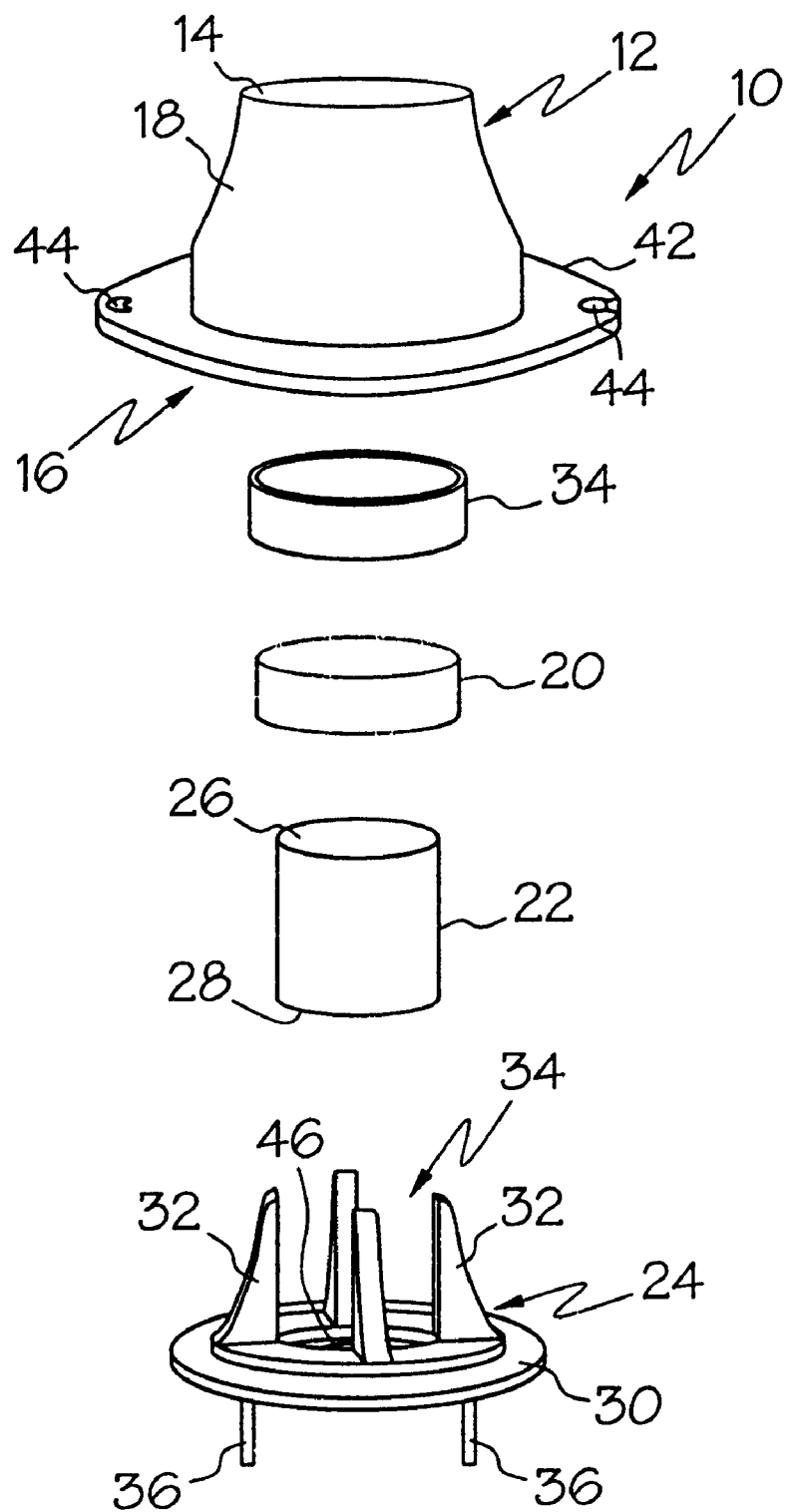
FIG. 1 is an exploded perspective view of one embodiment of a transducer in accordance with the present invention.
Figure 2:
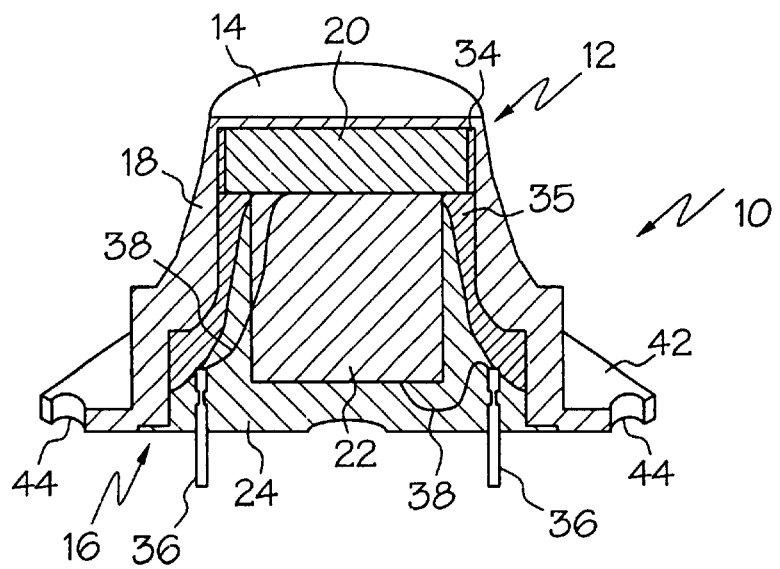
FIG. 2 is a perspective partial section view of an assembled transducer of FIG. 1.

Referring to the drawings, FIGS. 1 and 2 illustrate the main components of a transducer 10 of the present invention including a can or housing 12 having a closed end 14 and an open end 16 with side wall 18 extending therebetween. Closed end 14 is preferably formed integrally with the housing side wall 18. The entire housing may be formed from a molded plastic where the transducer 10 is to be used for low pressure applications, or, where the transducer 10 is to be used for high pressure applications it may be more suitable to form the housing 12 from a metal such as aluminum or stainless steel. A matching plate 20, resonator 22, and support member 24 are also provided.

The matching plate 20 is positioned within the housing 12 in contact with the inner surface of the closed end 14 of the housing 12 and acts as a quarterwave matching plate. The matching plate may be formed from known materials such as a cured epoxy compound or plastic bubble mix. The resonator 22 includes a transmitting and receiving end 26 facing the closed end 14 of the housing 12 and positioned against the matching plate 20, and an opposite end 28 facing the open end 16 of the housing. The resonator is preferably a cylindrical shaped piezoceramic type resonator which may be formed using conventional PZT-type piezoelectric ceramic materials. The support member 24 includes a base portion 30 having a plurality of arm members 32 extending therefrom toward the closed end 14 of the housing 12. The plurality of arm members 32 define a resonator receiving area or space 34 in which the resonator 22 is positioned such that an outer or side surface of the resonator is in contact with the arm members 32 such that the arm members 32 hold the resonator 22 in place within the housing 12. In this regard, an outer edge of the base portion 30 should be sized to contact the inner surface of the housing 12 when inserted therein so as to provide proper positioning of the resonator 22. The support member 24 may preferably be a molded plastic member.

A thin elastomer isolation ring 34 may also be provided between the outer surface of the matching plate 20 and the inner surface of the housing side wall 18 as necessary depending upon the materials used for the housing. In the case of a metallic housing 12 the isolation ring 34 will more likely be necessary while in the case of a plastic housing the need for the isolation ring 34 will generally depend upon the physical properties of the plastic used for the housing 12. When utilized, the isolation ring 34 provides an additional control on the reduction of ringing and the internal stresses under external pressures and pressure shocks. A damping medium 35 is also provided between the outer surface of the resonator 22 and the inner surface of the housing side wall 18 for reducing vibrations transmitted to the resonator 22 through the housing side wall 18, and for reducing vibrations transmitted to the housing from the resonator's side surface.

A pair of electrical lead pins 36 are partially embedded in the support member 24 and are connected to opposite ends of the resonator 22 by lead wires 38. The lead pins 36 extend out of the open end 16 of the housing 12 for connecting the transducer 10 to a control circuit. In operation, the closed end 14 of the housing 12 acts as a transmitting and receiving surface for sound waves. Received sound waves at the operating or resonating frequency are transmitted through the matching plate 20 to the resonator 22 causing the resonator 22 to generate a voltage differential which is monitored via the lead pins. Likewise, a voltage applied across the lead pins 36 causes the resonator 22 to resonate such that sound waves are transmitted from the closed end 14 of the housing 12.

Figure 3:
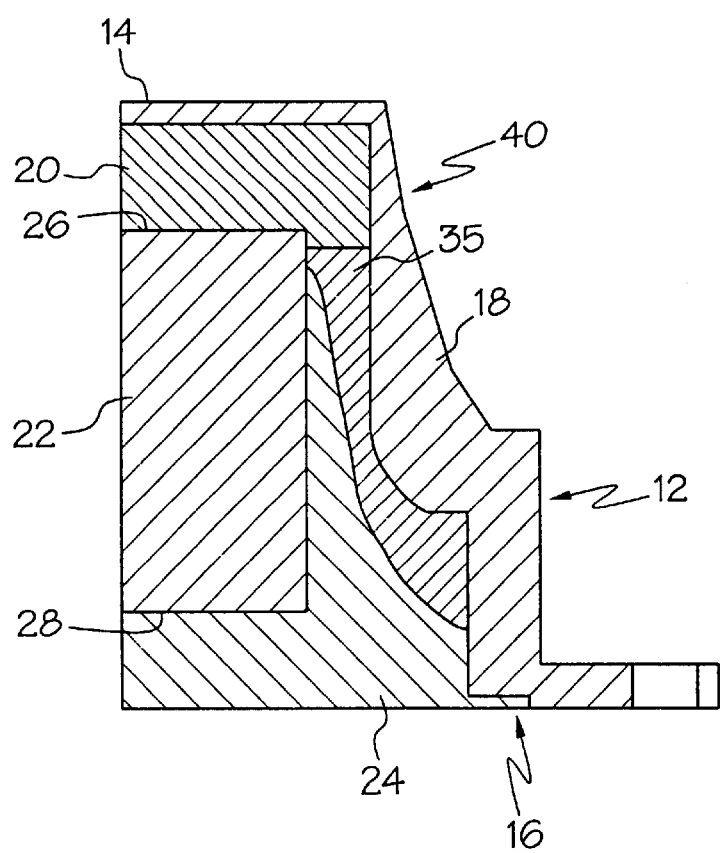
FIG. 3 is an enlarged partial section view of the transducer of FIG. 1.

The housing 12 should be shaped and configured to optimize performance of the transducer 10. In this regard, although a uniform cylindrical housing would be simpler to manufacture, the present invention provides that the outer diameter of the housing preferably gradually decreases toward the closed end 14 of the housing 12. This structural feature of the housing 12 improves ringing and bandwidth properties of the transducer 10. In particular, this housing shape tends to cause a radial housing vibration having a short, intense peak to transform into a vibration having a broad, dull peak (or possibly multiple peaks) running across a large frequency range. In other words, housing vibrations will have a larger bandwidth and the larger bandwidth will result in reduced or lower ringing of the transducer. Further, as best seen in the enlarged partial section view of FIG. 3, a thickness of the housing side wall 18 at the closed end 14 is less than at a position further toward the open end 16 of the housing, such as position 40. The thickness of the housing side wall 18 preferably gradually decreases toward the closed end 14 of the housing 12 as shown. This structural feature of the housing side wall 18 diverts and diffuses spurious vibrations which might otherwise occur near the resonating frequency of the transducer 10 in a manner similar to that described above.

Figure 4:
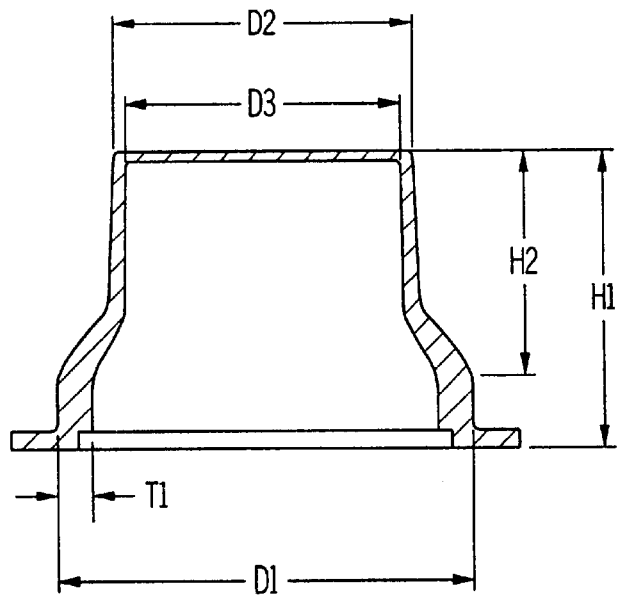
FIG. 4 is a section view of a housing in accordance with the present invention.

Reference is made to FIG. 4 to provide suggested quantitative size and configuration aspects of a transducer housing in accordance with the present invention having an operating or resonating frequency in a range from about one hundred (100) kHz to about three hundred (300) kHz. The side wall thickness at the open end is designated T1; the housing cross-length outer dimension (in this case diameter) at the open end is designated D1; the housing cross-length outer dimension at the closed end is designated D2; the housing cross-length inner dimension at the closed end is designated D3; the housing length or height is designated H1; and an intermediate length of the housing at which the side wall thickness becomes uniform is designated H2. A ratio T1/((D2–D3)/2)), that being the ratio of the thickness of the housing side wall at the open end to the thickness of the housing side wall at the closed end, preferably falls in a range of about 2 to 4. A ratio of D1/D2, that being the ratio of the cross-height dimension of the open end of the housing to the cross-height dimension of the closed end of the housing, preferably falls in a range of about 1.3 to 1.7. The height or length H1 and diameter D1 are preferably about 1 to 3 cm. Further, a ratio H2/H1 is preferably in a range of about 0.5 to about 0.75. Although the above dimensions and dimensional relationships are preferred, it is recognized that transducers having other dimensions and dimensional relationships are possible and such transducers are considered within the scope of the broader claims presented below.

For ease of use and installation, a mounting flange 42 extends outwardly from the housing side wall 18 at the open end 16 of the housing 12, such flange 42 including openings 44 adapted for securing the transducer 10 to a mount surface through the use of fasteners. The flange 42 may be formed integrally with the housing 12 as shown in FIGS. 1 and 2, but may likewise be formed separately from the housing 12 as will be discussed in more detail below.

Manufacture of the subject transducer 10 involves attaching lead wires 38 to the opposite ends of the resonator 22. The resonator is then positioned within the space 34 defined by the arm members 32 of the support member 24 and the lead wires 38 are soldered to the lead pins 36. The housing 12 is placed with the closed end 14 downward and, if utilized, the isolation ring 34 is placed into the housing 12. Uncured matching material is then introduced into the housing 12 from the open end 16 such that the material lies adjacent the inner side of the closed end 14 of the housing 12. The uncured matching material may be pressed into position against the closed end 14 of the housing. The combined resonator 22 and support member 24 is then loaded into the housing 12 such that the end 26 of the resonator contacts the matching material. An ultrasonic or resistive welding technique may be used to permanently bond the support member 24 to the housing 12.

To achieve and control the desired operating frequency of the transducer 10, the distance between the front end 26 of the resonator 22 and the outer surface of the closed end 14 of the housing is established as desired during manufacture by pushing the resonator 22 downward into the matching material until the desired position is achieved. For example, a plastic rod inserted through the central opening 46 of the support member 24 may be used for such purpose. The appropriate position of the front end 26 of the resonator 22 relative to the outer surface of the closed end 14 of the housing 12 may be determined if the axial length of the resonator 22 is known, the axial length of the housing 12 is known, and if the position of the back end 28 of the resonator 22 is monitored.

The assembly is then baked in an oven to cure the matching material. Thereafter, an uncured damping medium is injected into the spaced defined between the outer surface of the resonator 22 and the inner surface of the housing side wall 18. Breathing holes may be provided on the support member 24 for the injection process. Once the damping medium is injected another baking step is provided for curing the damping medium 35. Alternatively, the uncured damping medium may be injected before the matching material is cured such that both the matching material and the damping medium may be cured in a single step.

Figure 5:
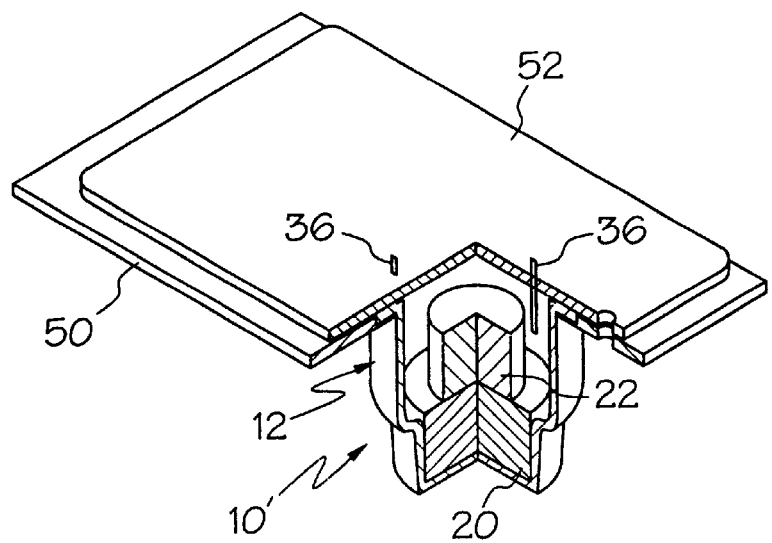
FIG. 5 is a perspective partial section view of an alternative embodiment of a transducer in accordance with the present invention.

The flange 42 of the transducer housing 12 may be used to secure the transducer to the body of a gas meter, with the closed end 14 of housing 12 positioned within the flow passage where gas flow is to be measured. An alternative arrangement for mounting a flangeless transducer is depicted in the embodiment of FIG. 5. The subject transducer 10' is similar to the transducer 10 but for the absence of a mounting flange. The transducer 10' is shown mounted to a meter housing 50 through use of a metal mounting plate 52 which covers the open end of the transducer 10'. The metal plate 52 protects the transducer from harsh environments which may sometimes exist in the region of gas meters in certain applications. As seen, when installed the closed end of the housing acts as an inner end and the open end of the housing acts as an outer end relative to the gas flow being measured.

Figure 6:
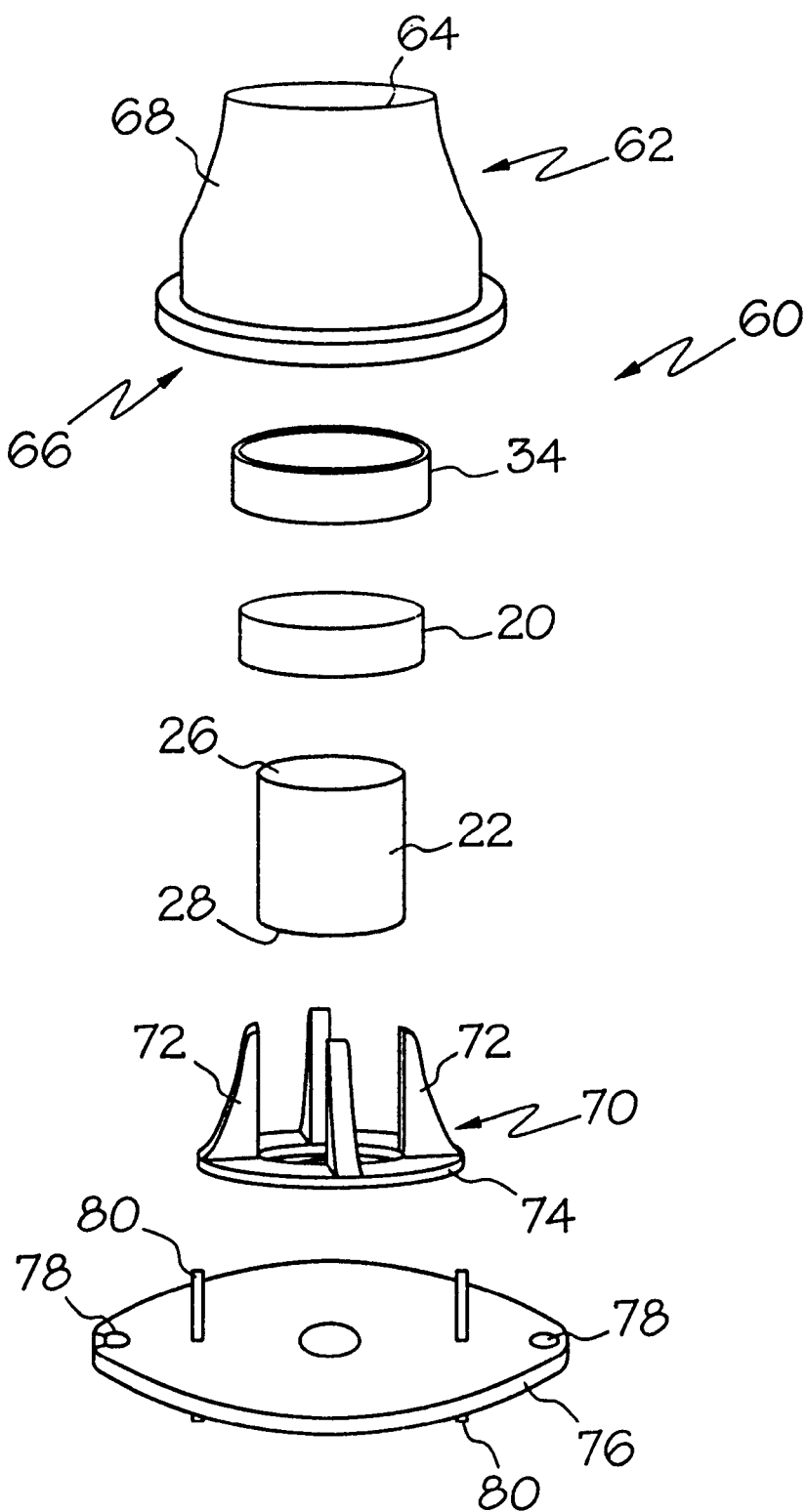
FIG. 6 is an exploded perspective view of an alternative embodiment of a transducer in accordance with the present invention.
Figure 7:
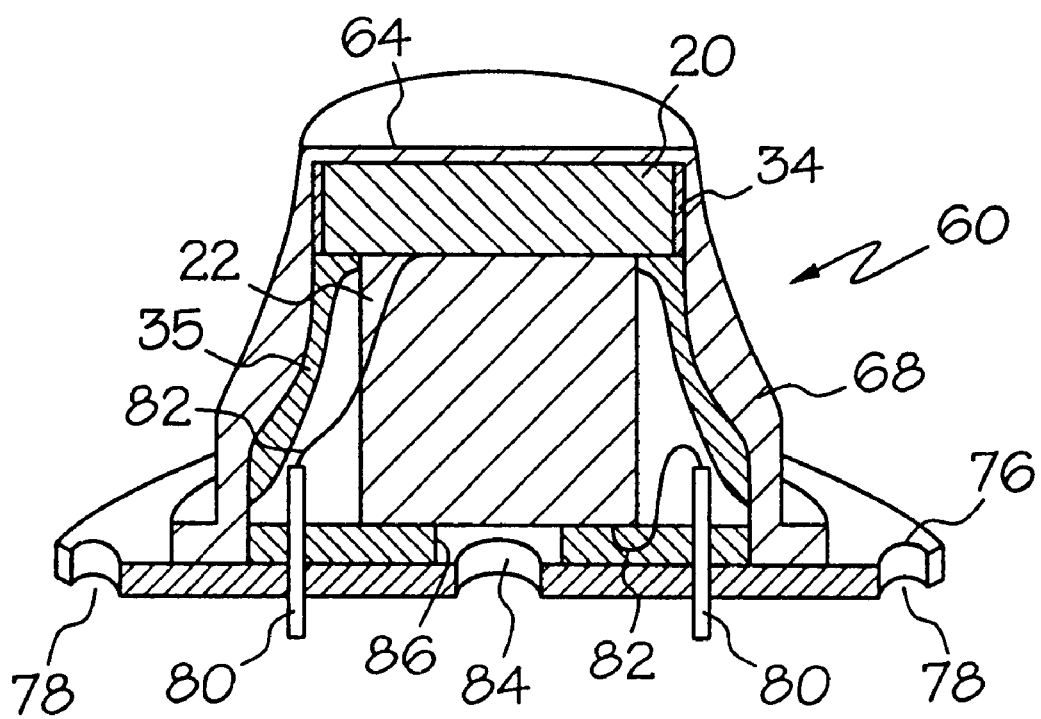
FIG. 7 is a perspective partial section view of the transducer of FIG. 6.

Referring now to FIGS. 6 and 7, an alternative embodiment of a transducer 60 in accordance with the present invention is shown. In this embodiment a flangeless housing 62 having a closed end 64 and an open end 66 are provided with side wall 68 extending between the ends. An isolation ring 34, matching plate 20 and resonator 22 are likewise provided as in the transducer 10. A support member 70 includes a plurality of arm members 72 extending from a base portion 74 such that the resonator can be received within the space defined by the arm members 72. A separate mounting flange 76 with mounting holes 78 is provided with lead pins 80 extending therethrough. When assembled the lead pins 80 extend through openings in the base of support member 70 and are electrically connected to opposed ends of the resonator 22 by lead wires 82. A damping medium 35 surrounds the resonator 22 as in transducer 10. An opening 84 is provided in the center of flange 76 along with an opening 86 in the center of the base 74 of support member 70 for the injection of the damping medium as well as for adjustment of the position of the resonator within the housing 62 as previously described with respect to transducer 10.

As with transducer 10, the housing 62 of transducer 60 may be formed of plastic or metal depending upon the application in which the transducer 60 is to be used. The thickness of the housing side wall 68 preferably gradually decreases toward the closed end 64 of the housing, again to improve ringing and band width properties of transducer 60. Further, a thickness of the housing side wall at the closed end 64 is less than at a position further toward the open end 66 of the housing 68, and the thickness of the housing side wall 18 preferably gradually decreases toward the closed end 64 of the housing as shown. As above, this structural feature of the housing side wall 68 diverts and diffuses spurious vibrations which might otherwise occur near the resonating frequency of the transducer 60. In higher pressure applications the housing 62 of transducer 60 would likely be formed of aluminum or stainless steel and the flange 76 would also be formed of a metal of some type. The high pressure limitations of such a transducer will generally be related to the thickness of the closed end 64 of the housing 62, with a thicker closed end 64 facilitating operation at higher pressures. Manufacture of the transducer 60 is achieved in a similar manner to transducer 10.

In all of the transducer configurations provided herein, the operating frequency is a function of the distance between the inwardly facing end of the resonator and the outer surface of the closed end of the housing. Even with the relatively simple configurations provided, it can be difficult to manufacture a large number of transducers with a desired operating frequency. Accordingly, in another aspect of the present invention a method of manufacturing suitable for any of the disclosed transducer configurations, as well as other configurations having a housing with a closed end, is provided.

In particular, a method of manufacturing a transducer for operation within a predetermined frequency range involves providing a housing having an open end and a closed end with a side wall extending between the ends. A resonator is provided within the housing with a first end facing the closed end of the housing and a second end facing the open end of the housing. Once the transducer is initially assembled, as described above for example, a determination is made as to whether an initial operating frequency of the transducer is outside the predetermined frequency range. This determination can be made, for example, by actually connecting the transducer in a test station. A thickness of the closed end of the housing is adjusted if the initial operating frequency is determined to be outside the predetermined frequency range. Adjusting the thickness of the closed end of the housing correspondingly adjusts the distance between the first end of the resonator and the outer surface of the closed end of the housing to likewise adjust the operating frequency of the transducer.

The adjusting step involves reducing the thickness of the closed end of the housing if the initial operating frequency is determined to be below the predetermined frequency range. For example, a lapping procedure such as a mechanical sanding or chemical etching may be utilized to reduce the thickness of the closed end of the housing. The adjusting step involves increasing the thickness of the closed end of the housing if the initial operating frequency is determined to be above the predetermined frequency range. For example, a thin layer of material (such as an epoxy or resin) may be formed on an outer surface of the closed end of the housing to increase its thickness using a spraying, painting, dip-coating, spin-coating, electrode positing or other suitable technique. The transducer can then be retested to confirm that the thickness adjustment properly adjusted the operating frequency of the transducer to within the predetermined range. Utilizing this manufacturing technique results in much higher production yields than have previously been achieved.

While the forms of the apparatus herein described constitute preferred embodiments of the invention, it is to be understood that the invention is not limited to these precise forms of apparatus, and changes may be made therein without departing from the scope of the invention.

What is claimed is:

1. A transducer for use in an ultrasonic gas flow meter, comprising:

a housing having an outer open end and an inner closed end with a side wall extending therebetween, the open end including a mounting flange for providing attachment on a gas flow meter, the closed end being shaped to receive and transmit ultrasonic waves when positioned within the gas flow meter;

a resonator positioned within the housing and having a transmitting and receiving end facing the closed end of the housing; and wherein a thickness of the housing side wall at the closed end is less than at a position further toward the open end, whereby spurious vibrations occurring at a resonating frequency of the transducer are reduced.

2. The transducer of claim 1 wherein the thickness of the housing side wall gradually decreases toward the closed end of the housing.

3. The transducer of claim 2 wherein a ratio of the thickness of the housing side wall at the open end to the thickness of the housing side wall at the closed end falls within a range of about 2 to 4.

4. The transducer of claim 2 wherein a cross-height dimension of the open end of the housing is larger than at the closed end of the housing.

5. The transducer of claim 4 wherein the cross-height dimension comprises an outer diameter of the housing side wall, and the outer diameter of the housing side wall gradually decreases toward the closed end of the housing.

6. The transducer of claim 5 wherein a ratio of the outer diameter of the open end of the housing side wall to an outer diameter of the closed end of the housing side wall falls in a range of about 1.3 to 1.7.

7. The transducer of claim 1 further comprising:

a matching plate positioned against an inner surface of the closed end of the housing; and wherein the first end of the resonator is positioned against the matching plate.

8. The transducer of claim 7 wherein the resonator comprises a cylindrical piezoceramic resonator, an opposite end of the resonator facing the open end of the housing.

9. The transducer of claim 7 further comprising:

an elastomer isolation ring positioned between the matching plate and the housing side wall.

10. The transducer of claim 1 further comprising:

a resonator support positioned within the housing, the resonator support including a base portion and a plurality of arm members extending therefrom, the resonator positioned within a space defined by the plurality of arm members, at least a portion of the resonator support in contact with an inner surface of the housing side wall.

11. The transducer of claim 10 further comprising:

a damping medium positioned within the housing between the housing side wall and the resonator.

12. The transducer of claim 10 further comprising:

a first lead pin extending from the base portion of the resonator support, the first lead pin connected to the transmitting and receiving end of the resonator;

a second lead pin extending from the base portion of the resonator support, the second lead pin connected to an opposite end of the resonator; and wherein the first and second lead pins each extend out of the open end of the housing for connection to a transducer control circuit.

13. The transducer of claim 1 wherein the mounting flange extends outwardly beyond the housing side wall and is formed integrally with the housing side wall.

14. The transducer of claim 1 wherein the mounting flange extends outwardly beyond the housing side wall and is formed separately from the housing side wall.

15. The transducer assembly of claim 1 wherein the closed end of the housing is formed integrally with the housing side wall.

16. The transducer of claim 1 wherein the housing comprises a metal housing.

17. The transducer of claim 1 wherein the housing comprises a plastic housing.

18. A transducer for use in an ultrasonic gas flow meter, comprising:

a housing having an outer open end and an inner closed end with a side wall extending therebetween, the open end including a mounting flange for providing attachment on a gas flow meter, the closed end being shaped to receive and transmit ultrasonic waves when positioned within the gas flow meter;

a resonator positioned within the housing with a transmitting and receiving end facing the closed end of the housing; and wherein an outer diameter of the housing side wall gradually decreases toward the closed end of the housing, whereby the magnitude of undesirable incidental housing vibrations is reduced.

19. The transducer of claim 18 wherein a thickness of the housing side wall gradually decreases toward the closed end of the housing, whereby spurious vibrations occurring at a resonating frequency of the transducer are reduced.

20. The transducer of claim 19 further comprising:

a matching plate positioned between the closed end of the housing and the transmitting and receiving end of the resonator; and a resonator support positioned within the housing and including a base portion and a plurality of arm members extending from the base portion toward the closed end of the housing, at least a portion of the resonator support in contact with a side surface of the resonator for positioning the resonator centrally within the housing.

21. The transducer of claim 20 further comprising:

a damping medium positioned between the side surface of the resonator and an inner surface of the housing side wall; and first and second lead pins extending from the base portion of the resonator support and out of the open end of the housing, each lead pin electrically connected to a respective end of the resonator.

22. The transducer of claim 21 further comprising:

an elastomer isolation ring positioned between a side surface of the matching plate and the inner surface of the housing side wall.

23. The transducer of claim 18 wherein an operating frequency of the transducer falls within a range of about 100 kHz to about 300 kHz.

24. An ultrasonic transducer, comprising:

a housing having an open end and a closed end with a side wall extending therebetween, the closed end for receiving and transmitting sound waves;

a resonator positioned within the housing with a transmitting and receiving end facing the closed end of the housing;

a resonator support positioned within the housing and including a base portion and a plurality of arm members extending from the base portion toward the closed end of the housing, at least a portion of the resonator support in contact with a side surface of the resonator and at least a portion of the base portion in contact with an inner surface of the housing side wall for positioning the resonator within the housing.

25. The transducer of claim 24 wherein a thickness of the housing side wall gradually decreases toward the closed end of the housing and wherein an outer diameter of the housing side wall gradually decreases toward the closed end of the housing.

26. The transducer of claim 24 wherein an outer edge of the base portion is in contact with the inner surface of the housing side wall.

27. The transducer of claim 24 further comprising:

a matching plate positioned within the housing and against the closed end of the housing, wherein the transmitting and receiving end of the resonator is positioned against the matching plate; and a damping medium positioned between the side surface of the resonator and the inner surface of the housing side wall.

28. An ultrasonic transducer, comprising:

a housing having an open end and a closed end with a side wall extending therebetween, the closed end for receiving and transmitting sound waves;

a resonator positioned within the housing with a transmitting and receiving end facing the closed end of the housing; and wherein a thickness of the housing side wall gradually decreases toward the closed end of the housing and wherein an outer diameter of the housing side wall gradually decreases toward the closed end of the housing.

29. A method of manufacturing a transducer comprising the steps of:

providing a support member having a base portion and a plurality of arm members extending from the base portion;

positioning a resonator within a space defined by the plurality of arms of the support member;

providing a housing having an open end and a closed end with a side wall extending between the ends;

introducing a matching material into the housing from the open end such that the matching material lies adjacent the closed end of the housing;

loading the resonator and support member simultaneously into the open end of the housing such that a transmitting and receiving end of the resonator contacts the matching material; and introducing a damping medium into a space defined between an outer surface of the resonator and an inner surface of the housing side wall.

30. The method of claim 29 wherein prior to the loading step a first lead pin is electrically connected to the first end of the resonator and a second lead pin is electrically connected to a second end of the resonator.

31. A method of manufacturing a transducer for operation within a predetermined frequency range, the method comprising the steps of:

assembling the transducer including:

providing a housing having an open end and a closed end with a side wall extending between the ends;

providing a matching plate adjacent an inner surface of the closed end of the housing;

providing a resonator within the housing and having a transmitting and receiving end facing the closed end of the housing and contacting the matching plate, the resonator having an opposite end facing the open end of the housing;

testing the assembled transducer by operating the transducer, including:

determining whether an initial operating frequency of the assembled transducer is outside the predetermined frequency range; and adjusting a thickness of the closed end of the housing if the initial operating frequency is determined to be outside the predetermined frequency range.

32. The method of claim 31 wherein the adjusting step involves reducing the thickness of the closed end of the housing if the initial operating frequency is determined to be below the predetermined frequency range.

33. The method of claim 32 wherein the thickness of the closed end of the housing is reduced utilizing a lapping procedure.

34. The method of claim 31 wherein the adjusting step involves increasing the thickness of the closed end of the housing if the initial operating frequency is determined to be above the predetermined frequency range.

35. The method of claim 34 wherein the thickness of the closed end of the housing is increased by forming a layer of material on an outer surface of the closed end of the housing.

36. A method of manufacturing a transducer for operation within a predetermined frequency range, the method comprising the steps of:

providing a housing having an open end and a closed end with a side wall extending between the ends;

providing a resonator within the housing and having a transmitting and receiving end facing the closed end of the housing and an opposite end facing the open end of the housing;

determining whether an initial operating frequency of the transducer is outside the predetermined frequency range;

adjusting a thickness of the closed end of the housing if the initial operating frequency is determined to be outside the predetermined frequency range;

providing a matching plate adjacent an inner surface of the closed end of the housing; and wherein the step of providing the resonator within the housing includes positioning the resonator within a space defined by a plurality of arms extending from a base portion of a support member and inserting the combined resonator and support member into the open end of the housing until the first end of the resonator contacts the matching plate.

37. A method of manufacturing a transducer for operation within a predetermined frequency range, the method comprising the steps of:

(a) assembling the transducer including:
 (1) providing a housing defining a transmitting and receiving end of the transducer, providing a matching plate adjacent an inner surface of the transmitting and receiving end, and providing a resonator within the housing and having a transmitting and receiving end contacting the matching plate and facing the transmitting and receiving end of the housing;

(b) testing the assembled transducer by operating the transducer, including:
 (1) determining whether an initial operating frequency of the assembled transducer is outside the predetermined frequency range; and (c) adjusting a thickness of the closed end of the housing if the initial operating frequency is determined to be outside the predetermined frequency range, including:
 (1) reducing the thickness of the closed end of the housing if the initial operating frequency is determined to be below the predetermined frequency range; and
 (2) increasing the thickness of the closed end of the housing if the initial operating frequency is determined to be above the predetermined frequency range.

38. The method of claim 37, including repeating step (b) after one of steps (c)(1) and (c)(2) is performed.

39. A method of manufacturing a transducer for operation at a predetermined frequency, the method comprising the steps of:

assembling the transducer including:
 (1) providing a housing defining a transmitting and receiving end of the transducer, providing a matching plate adjacent an inner surface of the transmitting and receiving end, and providing a resonator within the housing and having a transmitting and receiving end contacting the matching plate and facing the transmitting and receiving end of the housing;

(b) testing the assembled transducer by operating the transducer, including:
 (1) determining whether an initial operating frequency of the assembled transducer is different than the predetermined frequency; and (c) adjusting a thickness of the closed end of the housing if the initial operating frequency is determined to be different than the predetermined frequency, including:
 (1) reducing the thickness of the closed end of the housing if the initial operating frequency is determined to be below the predetermined frequency; and
 (2) increasing the thickness of the closed end of the housing if the initial operating frequency is determined to be above the predetermined frequency.

40. The method of claim 39, including repeating step (b) after one of steps (c)(1) and (c)(2) is performed.

* * * * *